US012690575B1

(12) United States Patent
Reynolds et al.

(10) Patent No.: US 12,690,575 B1
(45) Date of Patent: Jul. 28, 2026

(54) BANK POLE FISHING APPARATUS

(71) Applicants: James Howard Reynolds, Bartlett, KS
(US); Jerry Todd Sutherlin, Nowata,
OK (US)

(72) Inventors: James Howard Reynolds, Bartlett, KS
(US); Jerry Todd Sutherlin, Nowata,
OK (US)

( * ) Notice: Subject to any disclaimer, the term of this
patent is extended or adjusted under 35
U.S.C. 154(b) by 0 days.

(21) Appl. No.: 19/194,228

(22) Filed: Apr. 30, 2025

(51) Int. Cl.
| | |
|---|---|
| *A01K 87/02* | (2006.01) |
| *A01K 69/00* | (2006.01) |
| *A01K 89/08* | (2006.01) |
| *A01K 97/00* | (2006.01) |
| *A01K 97/10* | (2006.01) |
| *A01K 97/12* | (2006.01) |

(52) U.S. Cl.
CPC .............. *A01K 87/02* (2013.01); *A01K 69/00*
(2013.01); *A01K 89/08* (2013.01); *A01K 97/00*
(2013.01); *A01K 97/10* (2013.01); *A01K 97/12*
(2013.01)

(58) Field of Classification Search
CPC ........ A01K 87/02; A01K 69/00; A01K 89/08;
A01K 97/00; A01K 97/10; A01K 97/12
See application file for complete search history.

(56) References Cited

U.S. PATENT DOCUMENTS

| | | | | |
|---|---|---|---|---|
| 2,653,840 | A | * | 9/1953 | Bitzer .................... A01K 87/02 |
| | | | | 16/427 |
| 5,083,395 | A | * | 1/1992 | Daniels .................. A01K 69/06 |
| | | | | 212/175 |
| 2015/0250155 | A1 | * | 9/2015 | Ju .......................... A01K 87/02 |
| | | | | 43/18.1 CT |
| 2022/0071378 | A1 | * | 3/2022 | Stockton ................ F16M 11/28 |
| 2022/0394969 | A1 | * | 12/2022 | Davila ................... A01K 97/10 |
| 2025/0185637 | A1 | * | 6/2025 | SoRelle ................. A01K 97/12 |

FOREIGN PATENT DOCUMENTS

WO       WO-2012116424 A1 *   9/2012   ............. A01K 89/08

* cited by examiner

*Primary Examiner* — Richard G Davis
(74) *Attorney, Agent, or Firm* — Dale J. Ream

(57) ABSTRACT

A bank pole fishing apparatus includes an elongate pole
having a sharpened lower end for insertion into the ground
surface adjacent a body of water. The apparatus includes an
endcap configured to receive and guide a fishing line toward
and into the water. The apparatus includes a first collar
referred to as a cleat to which the fishing line may be secured
and which may be slidably moved upwardly or downwardly
along the pole for the purpose of adjusting the position of a
baited hook in the body of water. The apparatus includes a
tension release member that is also capable of regulating the
fishing line and includes a pair of legs that initially captures
the fishing line and resists release thereof until a pulling
force indicative of a fish strike is detected.

20 Claims, 8 Drawing Sheets

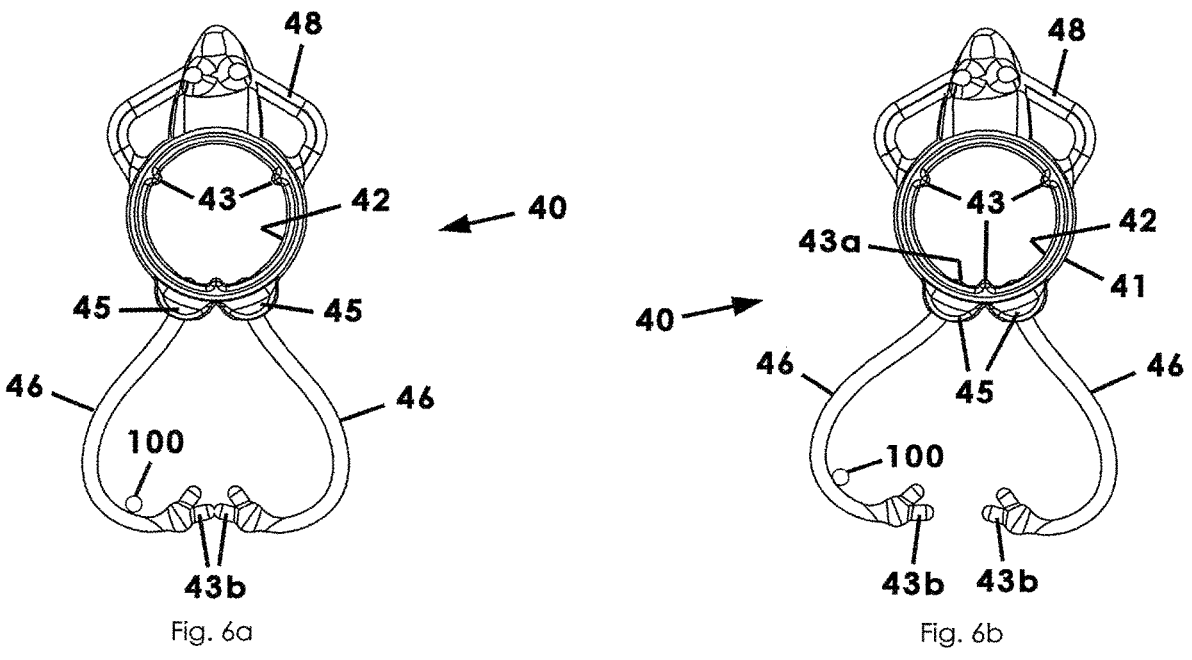
Fig. 6a
Fig. 6b
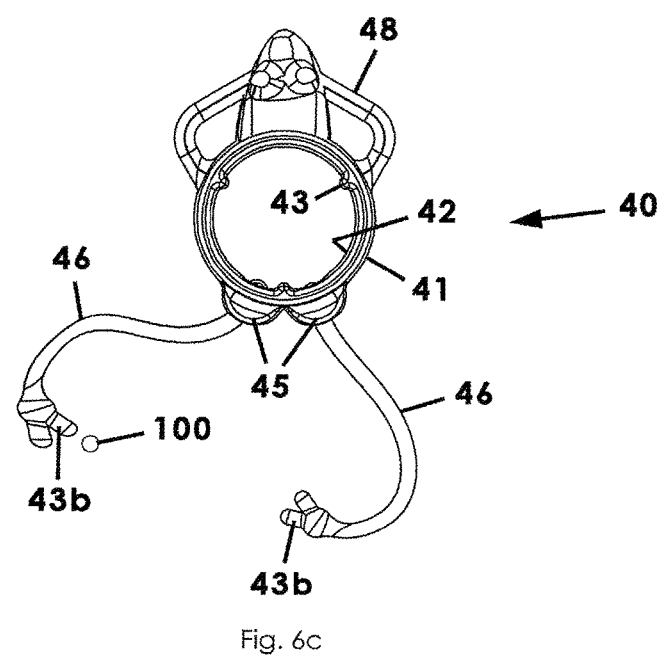
Fig. 6c

34

30

32

30

32

30

34

BANK POLE FISHING APPARATUS

BACKGROUND OF THE INVENTION

This invention relates generally to fishing equipment and, more particularly, a fishing apparatus using a pole inserted into the ground surface proximate the fishing area and from which a fishing line, hook, and bait is extended from the pole, the fishing line being prevented from rapid extension away from the pole until greater than a predetermined amount of pulling force indicative of a fish strike is experienced.

Fishing is a popular recreational activity enjoyed by millions of people worldwide. Among the various fishing techniques, bank pole fishing is widely practiced due to its simplicity and effectiveness. This method involves securing a fishing line to a flexible pole, which is then inserted into the ground along the bank of a pond, lake, or river. The flexibility of the pole allows for natural movement of the bait in the water, attracting fish while freeing the angler from the need to hold the pole continuously.

One of the challenges associated with bank pole fishing is adjusting the distance that a baited hook extends from the bank into the water. Various factors such as water depth, underwater obstructions, and fish activity levels influence the ideal placement of the baited hook. Anglers must often experiment with placement to maximize their chances of catching fish, which can be time-consuming and inefficient.

Another major disadvantage of bank pole fishing is the risk of a fish strike breaking the fishing line. When a fish bites and pulls forcefully on the line, a sudden increase in tension may exceed the line's strength, leading to breakage and loss of both the fish and tackle. This issue is particularly problematic when targeting larger or more aggressive fish species. This scenario describes how a strong fish may swim away rapidly from the location where he was first hooked and where a fishing line may be severed or snapped if the fishing line is resisted and with an equal or greater tension. Additionally, premature triggering of the pole's movement due to minor disturbances such as water currents or small fish can lead to false alarms, reducing the efficiency of the fishing setup.

Accordingly, it would be desirable to have a bank pole fishing apparatus that includes at least one and preferably two mechanisms, such as adjustable collars slidably positioned on a bank pole that are configured to adjustably cause a fishing hook or bait to be set in a body of water either closer to or further away from the edge of the water (e.g., a riverbank, pond bank, or creek bank) Further, it would be desirable to have a bank pole fishing apparatus that can resist a fish pulling the baited hook away until a predetermined pulling force indicative of a true fish strike is detected. Such a mechanism would improve the reliability of bank pole fishing by reducing false triggers and preventing line breakage, ultimately enhancing the overall fishing experience. An improved bank pole fishing system could provide anglers with a more efficient and effective way to catch fish while minimizing lost bait and equipment.

SUMMARY OF THE INVENTION

A bank pole fishing apparatus for setting a fishhook or bait a predetermined distance from an edge of a body of water, said fishing apparatus comprising a bank pole that includes a lower end having a sharpened configuration for insertion into a ground surface proximate the body of water and having an upper end opposite the lower end.

In another aspect, the fishing apparatus includes an endcap coupled to the upper end of the bank pole, the endcap defining a channel for receiving a fishing line therethrough. The fishing apparatus includes a first collar (also referred to as a cleat) coupled to the bank pole and that includes a line attachment flange for securing a terminal end of the fishing line, the first collar being attached to the bank pole in a friction fit attachment and that is selectively slidably movable therealong closer to the endcap or further away from the endcap in order to adjust a distance that the fishhook or bait is positioned relative to the edge of the body of water. The fishing line is directed from the first collar to and through the channel of the endcap.

In a critical aspect, the fishing apparatus includes a second collar (also referred to as a tension release member) slidably coupled to the bank pole in a friction fit arrangement and that includes a line capturing area for receiving the fishing line and that is selectively and slidably movable therealong closer to the first collar or away from the first collar in a manner that simultaneously moves the fishhook or bait closer to or further away from the edge of the body of water, respectively. Preferably, the fishing line is directed from the first collar to the endcap and then to the second collar.

Specifically, the tension release member includes a pair of legs that, together, define the line capturing area, each leg having a proximal end coupled to a pivot socket defined by a body portion of the line tensioning member and a distal end opposite the proximal end, said pair of legs (1) being normally tensioned such that said distal ends bear against one another and (2) being separated from one another when the fishing line is subjected to more than a predetermined amount of tension indicative of a fish strike. The fishing line is released from the line capturing area when said pair of legs are separated one from the other.

Therefore, a general object of this invention is to provide a bank pole fishing apparatus that can resist a fish pulling away a baited hook until a predetermined pulling force indicative of a true fish strike is detected.

Another object of this invention is to provide a bank pole fishing apparatus, as aforesaid, having at least one and preferably two mechanisms, such as adjustable collars slidably positioned on a bank pole that are configured to adjustably cause a fishing hook or bait to be set in a body of water either closer to or further away from the edge of the water.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIGS. 6a to 6c are top side views illustrating the progression from a ready configuration to a release configuration according to the present invention;

FIG. 7 is an exploded view of the tension release member as in FIG. 5a;

FIG. 8b is a side view of the cleat as in FIG. 8a; and

DESCRIPTION OF THE PREFERRED EMBODIMENT

Figure 1A:
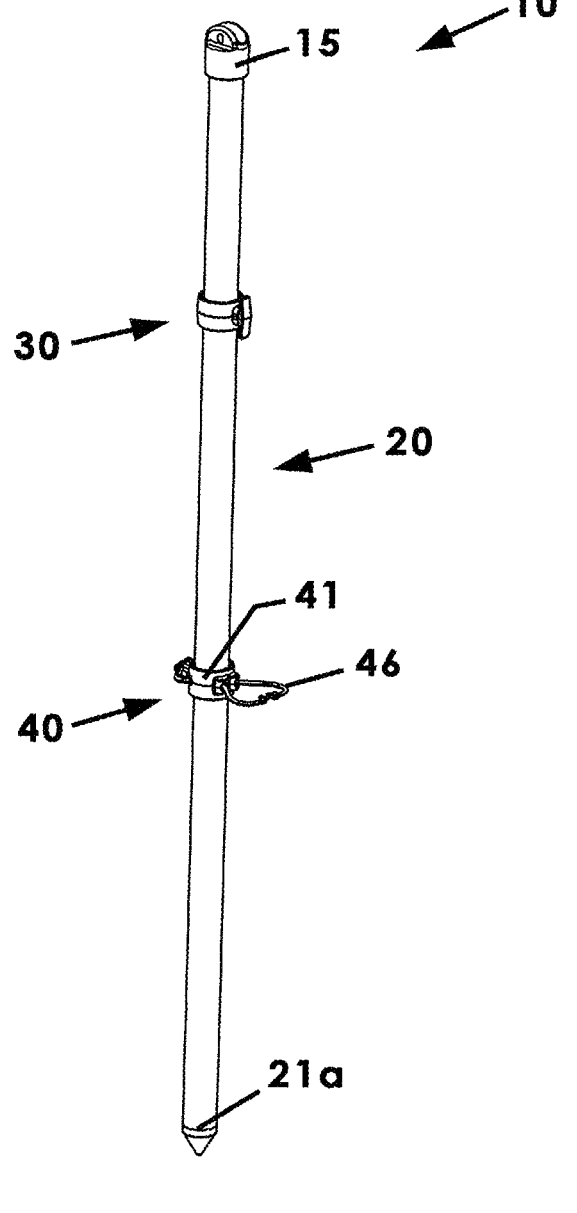
FIG. 1*a* is a perspective view of a bank pole fishing apparatus according to a preferred embodiment of the present invention.
Figure 1B:
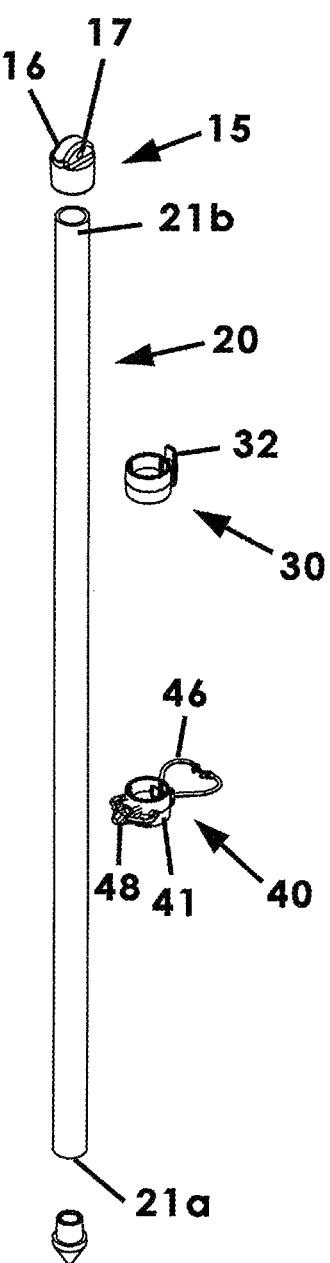
FIG. 1*b* is an exploded view of the fishing apparatus illustrated in FIG. 1*a;*

A bank pole fishing apparatus according to a preferred embodiment of the present invention will now be described with reference to the accompanying drawings. The bank pole fishing apparatus 10 includes a bank pole 20, an endcap 15, a cleat 30, and a tension release member 40.

Fishing from the shoreline or bank of a pond, lake, creek, or river involves securing a fishing line to a post or pole that is inserted into a ground surface. In other words, a baited hook be cast away from the shore hook may be extended from the pole into the water and left there potentially for long periods of time until a fish is hooked. Fishing from a pole inserted into a ground surface proximate a body of water may be contrasted with traditional fishing by a human holding a fishing rod and reel from which a fishing line may be cast away from a shoreline. Fishing with a traditional rod and reel has the advantage of the fishermen immediately detecting when a fish has been hooked and may then race away and the fishing line rapidly extended. The fishermen can gradually or incrementally slow, stop, and counteract the tension on the fishing line so as to avoid line breakage while reeling in the catch. By contrast, fishing using a bank pole outside of the immediate presence of a fisherman requires a unique configuration to avoid certain disadvantages such as line breakage.

Accordingly, the bank pole fishing apparatus 10 includes a pole 20 that may be inserted into a ground surface proximate a shoreline of a body of water. More particularly, the pole 20 has an elongate and linear configuration and includes a lower end 21a and an upper end 21b spaced apart that is opposed to be lower end 21a. Preferably, the pole 20 may have a generally cylindrical configuration that defines a hollow interior space and may be constructed of polyvinyl chloride (PVC) so as to be lightweight and portable while still being durable and resilient. Preferably, the lower end 21a has a sharpened configuration such that the pole 20 may be inserted into a ground surface, such as the ground adjacent a shoreline or creek bed.

In another aspect the fishing apparatus 10 may include an endcap 15 coupled to the upper end 21b of the pole 20. In an embodiment, the endcap 15 may have a sleeve-like configuration that is removably attached to the upper end 21b although having an integrated or unitary construction with the upper end 21b may also work. Importantly, the endcap 15 may include a guide portion 16 defining a channel 17 through which the fishing line 100 may extend—essentially serving as a stabilizer and directional guide of fishing line 100 as will be described in more detail later.

Figure 2:
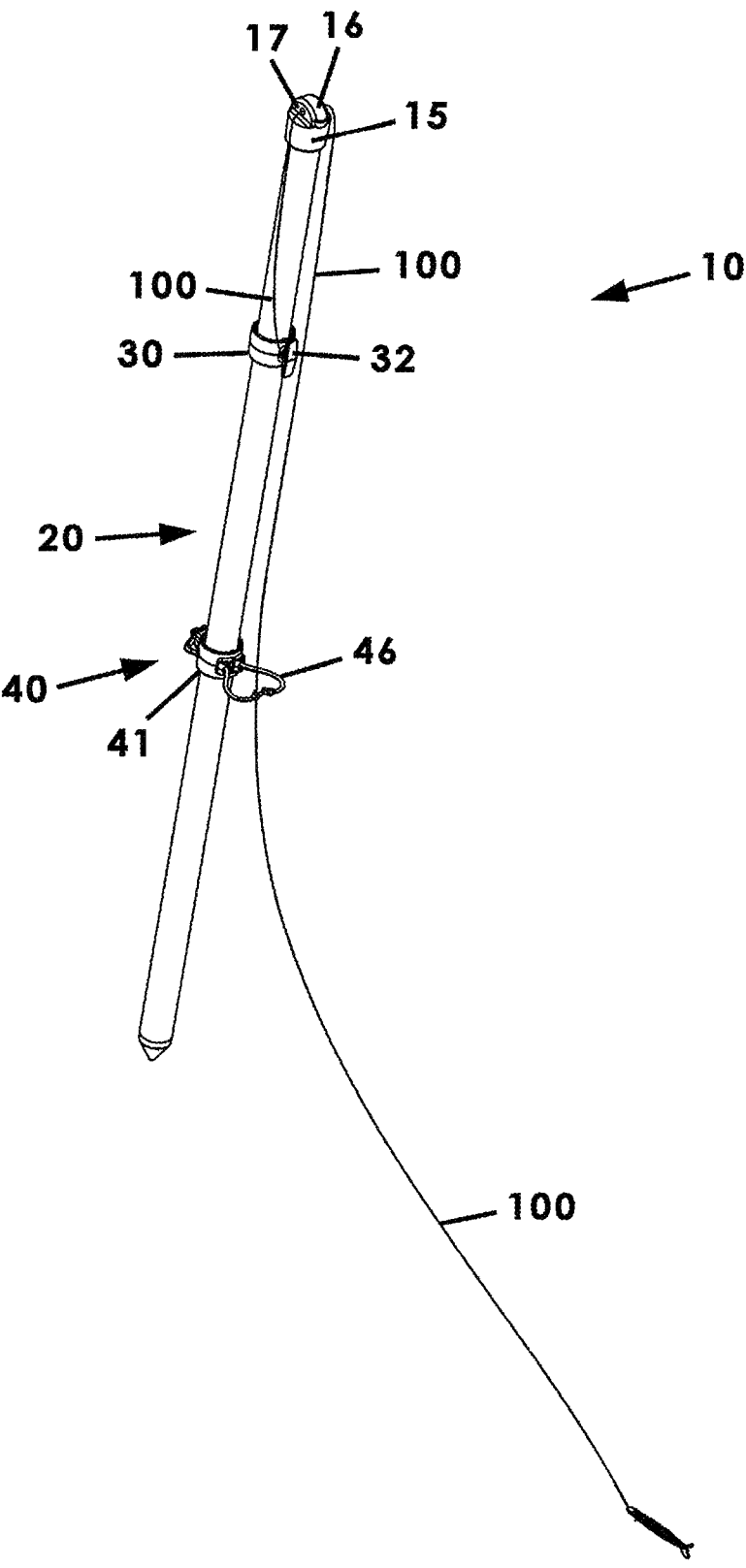
FIG. 2 is a perspective view of the fishing apparatus as in FIG. 1*a*, illustrated in use with a fishing line and baited hook.
Figure 3:
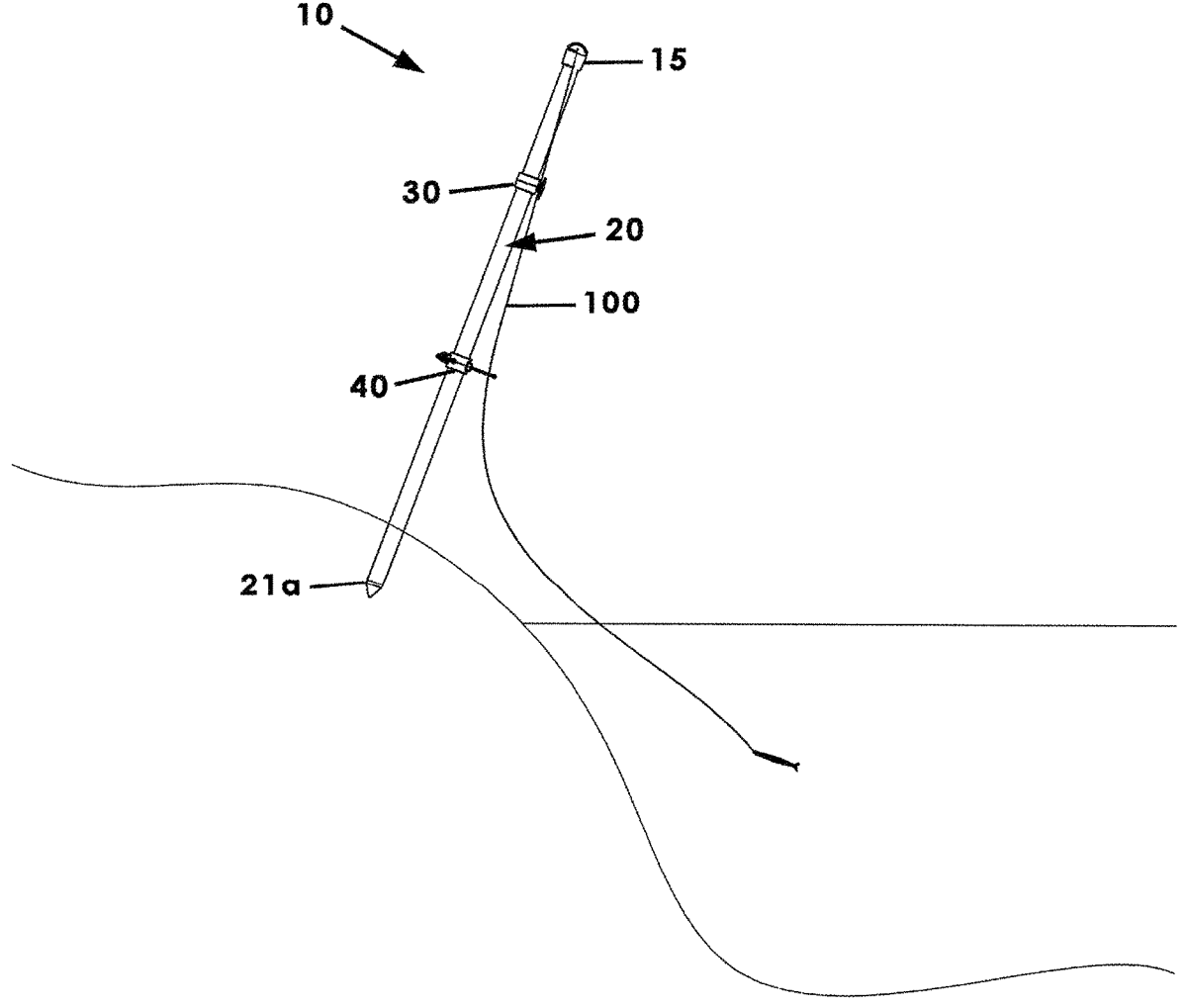
FIG. 3 is a diagrammatic view of the fishing apparatus as in FIG. 2, illustrated in use on a body of water and in a configuration for pulling the baited hook closer to the shoreline.
Figure 4:
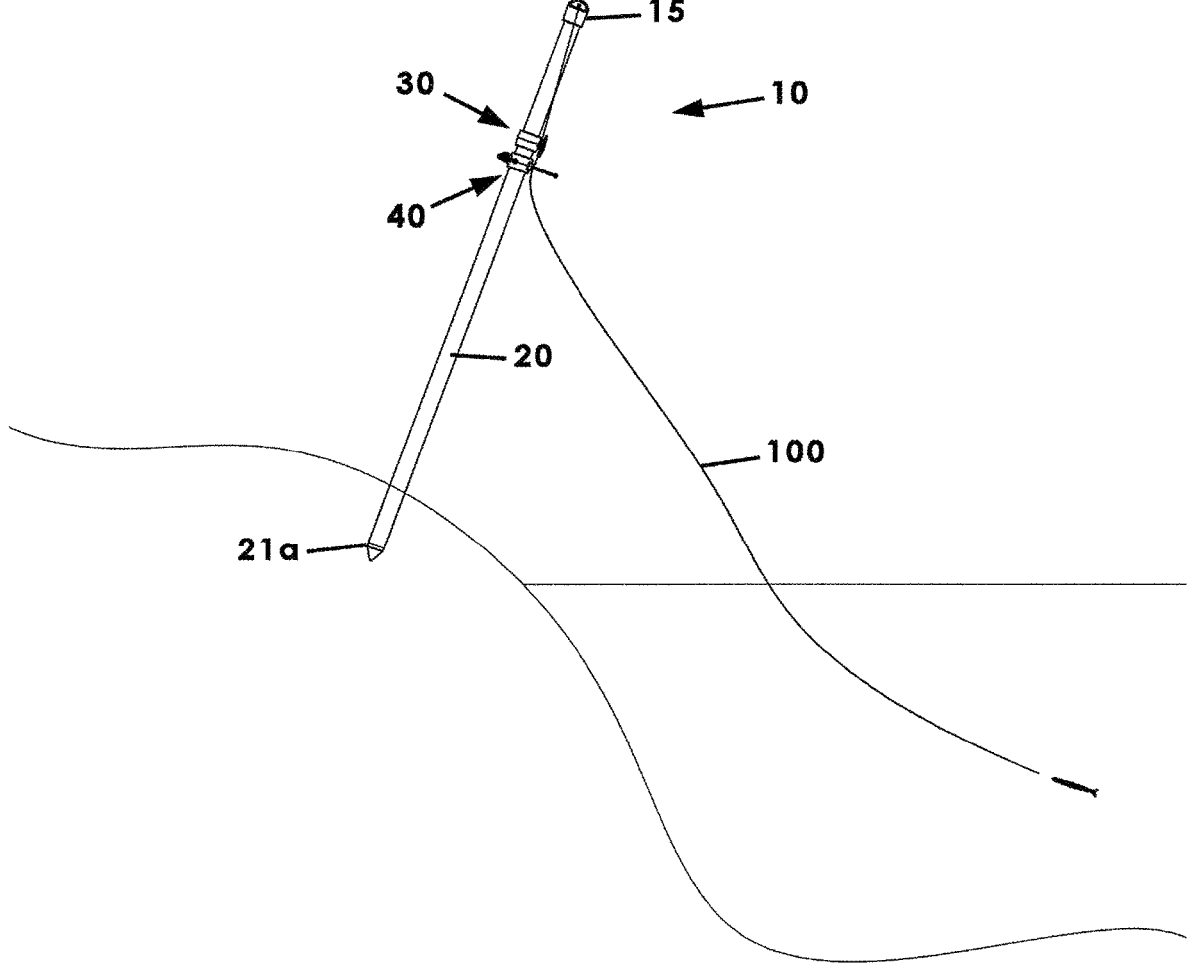
FIG. 4 is a diagrammatic view of the fishing apparatus as in FIG. 2, illustrated in use on a body of water and in a configuration that releases the fishing line and baited hook to move away from the shoreline.

In another aspect, the fishing apparatus 10 may include a first collar 30 attached to the pole 20 at a position downwardly adjacent the endcap 15. The first collar 30 may also be referred to as a cleat 30. In an embodiment, the cleat 30 may include a line attachment flange 32 to which a terminal end of the fishing line 100 may be wrapped, tied, or otherwise secured. Preferably, the cleat 30 has a generally cylindrical configuration that is capable of slidable movement along the pole 20. Stated another way, the cleat or first collar 30 may be slidably movable closer to the endcap 15 (i.e. moved upwardly along the pole 20) or slidably movable further advice from the endcap 15 (i.e. moved downwardly along the pole 20). Preferably, the fishing line 100 extends from the cleat 30 upwardly to the guide portion 16 and channel 17 of the endcap 15. As is understood from FIG. 2, moving the cleat 30 downwardly (i.e. away from the endcap 15) causes the hook that may be mounted to a downstream end of the fishing line 100 to be pulled closer to the pole 20 (and, correspondingly, closer to the shoreline). Stated another way, the cleat 30 and endcap 15 may operate together in the manner of a pulley device with the fishing line 100 being analogous to a pulley cable having a fixed length. Downward movement of the cleat 30 pulls the fishing line 100 from the water toward the endcap 15.

Preferably, the cleat 30 is coupled to the pole 20 in a friction fit arrangement. Accordingly, slidable movement of the cleat 30 is not without resistance. In general, the cleat 30 (a.k.a. first collar 30) includes a tightening mechanism. More particularly, the cleat 30 has a generally cylindrical configuration having an inner surface. The tightening mechanism may include a plurality of nubs 34 positioned on the inner surface for contact with the outer surface of the pole 20. It is understood that the nubs 34 may be individually raised bumps, strips, or other raised structures that are configured to hold the cleat 30 stationary when at rest but that enables the cleat 32 to move along a longitudinal axis defined by the pole 20 when manipulated by a fisherman.

In a critical aspect, the bank pole fishing apparatus 10 includes a tension release member 40 (also referred to as a second collar 40) that includes a body portion 41 that has a cylindrical configuration and that may be coupled to the bank pole 20. Similar to the cleat 30 described above, the body portion 41 may have a cylindrical configuration that has a continuous inner surface 42 and a tightening mechanism in the form of a plurality of nubs 43 configured to gently prevent unintentional movement along the pole 20 but that enable movement therealong when manipulated by the fishermen (FIGS. 5a to 6c). Accordingly, the body portion 41 of the tension release member 40 is selectively movable toward or away from the cleat 30 in a manner that correspondingly pulls the baited hook and fishing line 100 closer to the shore (and closer to the pole 20) or allows extension of the fishing line 100 to be more displaced from the shore (and further away from the pole 20), respectively.

Also in a critical aspect, the tension release member 40 includes a pair of legs 46 (also referred to as frog legs) extending generally from and away from the body portion 41 and which define a line capturing area 44 configured to receive the fishing line 100 that descends from the endcap 15 and channel 16. More particularly, each leg 42 may include a proximal end 43a pivotably mounted to a socket 45 mounted in or integrated into the body portion 41 and a distal end 43b opposite the proximal end 43a. In one configuration, the distal ends 43b bear against one another so that the pair of legs 46, together, define the line capturing area 44 that essentially captures the fishing line 100 and prevents it from being pulled away from the pole 20 (and, therefore, away from the shore). It will be understood that each socket 45 allows movement in only a single rotational direction and it is understood that each leg 42 may be constructed of a flexible material capable of bending and that is resilient to return to its original shape.

The structure described above is unique as it prevents the fishing line 100 from being inadvertently pulled away from the pole 20 (and, correspondingly, away from the shoreline) so long as the fishing line 100 is captured within the line capturing area 44—at least until a genuine fish strike is detected. In other words, a fish that bites the baited hook may jerk or swim rapidly away from the shore which places a load or tension on the fishing line 100 along with the potential that the line will be snapped or severed.

In a critical aspect of this invention, the tension release member 40, and the pair of legs 46 in particular, have a functionality for resisting the load of energy on the fishing line 100 up to a predetermined threshold level before releasing the line to be pulled away from the tension release member 40 and pole 20. More particularly, the pair of legs 46 are pivotally movable between (1) a ready configuration at which the distal ends 43b bear against one another so as to form a barrier to the fishing line 100 and (2) a release configuration at which the distal ends 43b are pulled away from one another thereby releasing the fishing line 100 from the line capturing area 44.

Stated another way, the pair of legs 46 is movable to the release configuration when more than a predetermined amount of pulling force (i.e., a force indicative of a fish strike) is loaded onto the fishing line 100. In other words, the pair of legs 46 will naturally resist movement as a result of less than the predetermined amount of pulling force (FIG. 6a) but will rotate when more than the predetermined amount of pulling force is applied so as to move the legs to the release configuration. This movement will involve rotational movement of the proximal ends 43a within the sockets 45 and corresponding displacement or separation of the distal ends 43b (FIGS. 6b and 6c).

Figure 5A:
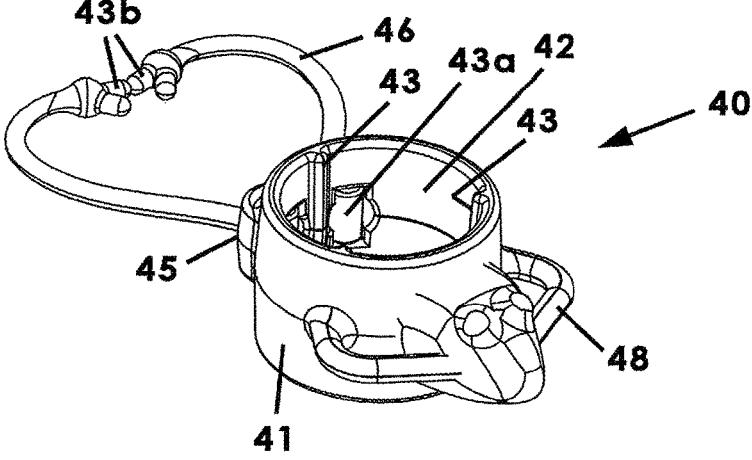
FIG. 5a is a perspective view of the tension release member taken from one angle.
Figure 5B:
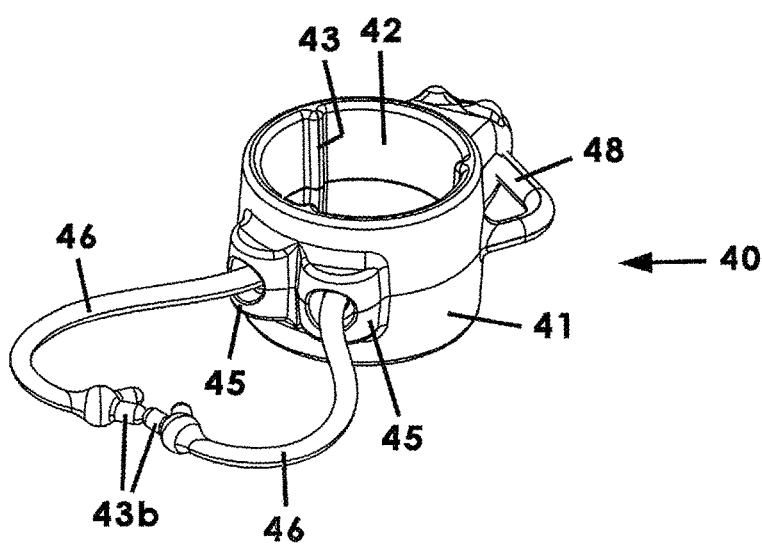
FIG. 5b is a perspective view of the tension release member taken from another angle.
Figure 7:
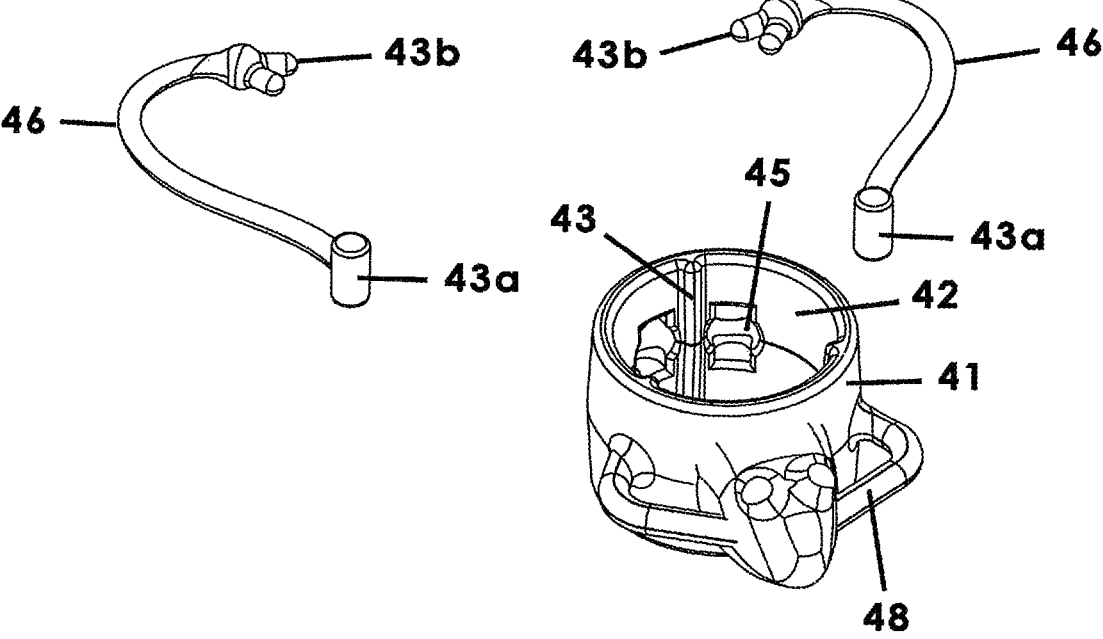
Figure 8A:
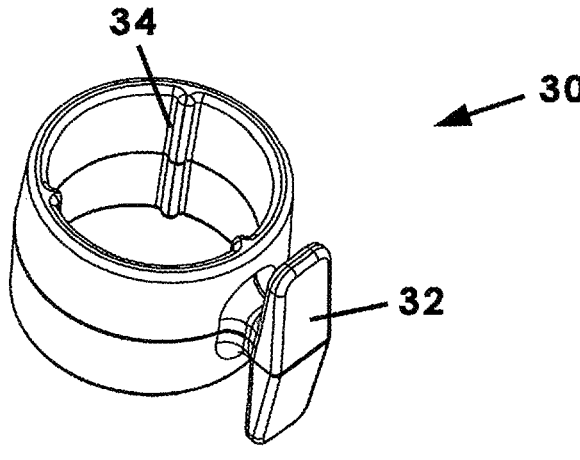
FIG. 8a is a perspective view of a cleat according to the present invention.
Figure 8B:
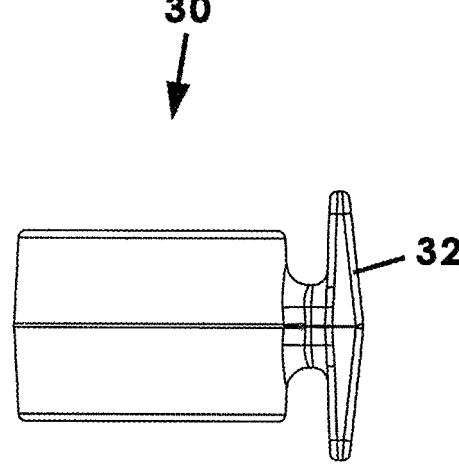
Figure 8C:
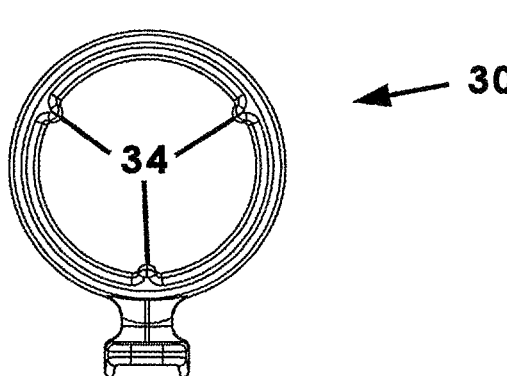
FIG. 8c is a top view of the cleat as in FIG. 8b.

In yet another aspect, the tension release member 40 may include at least one and preferably a plurality of fastener structures 48 such as of hooks, loops, or shelves arranged and configured to secure and hold a fishing hook, liver, or other fishing tackle (FIG. 5a).

In use, the bank pole fishing apparatus 10 includes an elongate pole 24 inserted into the ground surface adjacent a fishing area and from which a fishing line that includes a baited hook may be extended into the fishing area. The fishing apparatus uses one or more collars that are adjustable for use in the manner of a pulley system to regulate a distance a baited hook and fishing line is allowed to extend away from the shore. Further, the fishing apparatus includes a tension release member 40 that resists tension or pulling force applied to a fishing line up to a predetermined level indicative of an authentic fish strike before releasing a captured fishing line 100.

It is understood that while certain forms of this invention have been illustrated and described, it is not limited thereto except insofar as such limitations are included in the following claims and allowable functional equivalents thereof.

The invention claimed is:

1. A bank pole fishing apparatus for setting a hook or bait a predetermined distance away from a bank of a body of water, said bank pole fishing apparatus, comprising:
   a bank pole having an elongate and linear configuration, the bank pole including (1) a lower end having a sharpened configuration for insertion into a ground surface proximate a body of water and (2) an upper end opposite the lower end;

an endcap coupled to the upper end of the bank pole, the endcap defining a channel for receiving a fishing line therethrough;

a first collar coupled to the bank pole and that includes a line attachment flange for securing a terminal end of the fishing line, the first collar being attached to the bank pole in a friction fit attachment that is selectively slidably movable therealong so as to adjust a position of the fishhook or bait relative to an edge of the body of water;

a second collar coupled to the bank pole in a friction fit arrangement and that includes a pair of legs that define a line capturing area for receiving the fishing line, wherein the second collar is selectively slidably movable along the bank pole to simultaneously move the fishhook or bait closer to or further away from the edge of the body of water, each leg having a proximal end coupled to a pivot socket and a distal end opposite the proximal end, the pair of legs being pivotally movable between (1) a ready configuration at which the distal ends bear against one another and (2) a release configuration at which the distal ends are pulled away from one another thereby releasing the fishing line from the line capturing area.

2. The apparatus as in claim 1, wherein the pair of legs is movable to said release configuration when more than a predetermined amount of pulling force indicative of a fish strike is loaded on the fishing line.

3. The apparatus as in claim 1, wherein the pair of legs is movable to said release configuration when the pair of legs is pivoted outwardly.

4. The apparatus as in claim 1, wherein the pair of legs is movable to said release configuration when the proximal ends thereof are rotated in said pivot sockets, respectively, by a downstream pulling force on the fishing line situated in said line capturing area.

5. The apparatus as in claim 1 wherein the first collar is configured with a tightening mechanism to selectively secure the first collar at a desired position along the bank pole to prevent unintentional movement.

6. The apparatus as in claim 5, wherein:
   the first collar has a generally cylindrical configuration having an inner surface;
   the tightening mechanism includes a plurality of nubs spaced apart from one another along said inner surface of the first collar.

7. The apparatus as in claim 1 wherein the second collar is configured with a tightening mechanism to selectively secure the first collar at a desired position along the bank pole to prevent unintentional movement.

8. The apparatus as in claim 7, wherein:
   the second collar has a generally cylindrical configuration having an inner surface;
   the tightening mechanism includes a plurality of nubs spaced apart from one another along said inner surface of the first collar.

9. The apparatus as in claim 1, wherein said pair of legs is formed from a flexible material configured to store energy at said ready configuration, thereby providing a self-setting function while awaiting a fish strike.

10. The apparatus as in claim 1, wherein the fishing line is secured to the first collar and extends through the channel of the endcap and is then captured in the line capturing area defined by the pair of legs of the second collar so long as the pair of legs are in the ready configuration.

11. A bank pole fishing apparatus for setting a hook or bait a predetermined distance away from a bank of a body of water, said bank pole fishing apparatus, comprising:

a bank pole having an elongate and linear configuration, the bank pole including (1) a lower end having a sharpened configuration for insertion into a ground surface and (2) an upper end opposite the lower end;

an endcap coupled to the upper end of the bank pole that defines a channel for receiving a fishing line there-through;

a tension release member that includes a body portion having a pair of legs that define a line capturing area for receiving and retaining the fishing line extending from the endcap, the body portion having a cylindrical configuration and that is coupled to the bank pole proximate said endcap in a friction fit arrangement and that is selectively slidably movable along the bank pole to correspondingly move the fishhook or bait closer to or further away from the edge of the body of water, each leg having a proximal end operatively coupled to a pivot socket in said body portion and a distal end opposite the proximal end, the pair of legs being pivotally movable between (1) a ready configuration at which the distal ends bear against one another so as to form a barrier to the fishing line and (2) a release configuration at which the distal ends are pulled away from one another thereby releasing the fishing line from the line capturing area.

12. The apparatus as in claim 11, further comprising a cleat having a cylindrical configuration slidably coupled to the bank pole in a friction fit arrangement and positioned intermediate said line tension member and said endcap, said cleat having a line attachment flange for securing a terminal end of the fishing line which then extends downstream to the endcap.

13. The apparatus as in claim 12, wherein the cleat is selectively slidably movable along the bank pole toward or away from the endcap, respectively so as to adjust a position of the fishhook or bait to be closer to or further away from an edge of the body of water.

14. The apparatus as in claim 12, wherein the tension release member includes a plurality of fasteners extending away from said body portion and that are configured to receive fishing tackle for storage.

15. The apparatus as in claim 11, wherein the pair of legs is movable to said release configuration when more than a predetermined amount of pulling force indicative of a fish strike is loaded on the fishing line.

16. The apparatus as in claim 11, wherein the pair of legs is movable to said release configuration when the pair of legs is pivoted outwardly.

17. The apparatus as in claim 11, wherein the pair of legs is movable to said release configuration when the proximal ends thereof are rotated in said pivot sockets, respectively, by a downstream pulling force on the fishing line and when the fishing line is situated in said line capturing area.

18. The apparatus as in claim 11 wherein:

the cleat has a cylindrical configuration that includes an inner surface; and the cleat has a tightening mechanism to selectively secure the cleat at a desired position along the bank pole to prevent unintentional movement, said tightening mechanism includes a plurality of nubs spaced apart from one another along said inner surface of the cleat.

19. The apparatus as in claim 11 wherein:

said body portion of said tension release member as a cylindrical configuration that includes an inner surface; and said tension release member has a tightening mechanism to selectively secure the cleat at a desired position along the bank pole to prevent unintentional move-ment, said tightening mechanism includes a plurality of nubs spaced apart from one another along said inner surface of the body portion.

20. The apparatus as in claim 11, wherein said pair of legs is formed from a flexible material configured to store energy at said ready configuration, thereby providing a self-setting function while awaiting a fish strike.

* * * * *